United States Patent
Schuh et al.

(10) Patent No.: US 11,242,469 B2
(45) Date of Patent: Feb. 8, 2022

(54) ADHESIVE TAPE FOR ENCAPSULATING ELECTRONIC CONSTRUCTIONS

(71) Applicant: TESA SE, Norderstedt (DE)

(72) Inventors: Christian Schuh, Hamburg (DE); Thorsten Krawinkel, Hamburg (DE)

(73) Assignee: TESA SE, Norderstedt (DE)

(*) Notice: Subject to any disclaimer, the term of this patent is extended or adjusted under 35 U.S.C. 154(b) by 43 days.

(21) Appl. No.: 16/321,106

(22) PCT Filed: Jul. 17, 2017

(86) PCT No.: PCT/EP2017/067986
§ 371 (c)(1),
(2) Date: Jan. 28, 2019

(87) PCT Pub. No.: WO2018/019631
PCT Pub. Date: Feb. 1, 2018

(65) Prior Publication Data
US 2019/0161648 A1    May 30, 2019

(30) Foreign Application Priority Data
Jul. 27, 2016  (DE) ..................... 10 2016 213 840.5

(51) Int. Cl.
| | | |
|---|---|---|
| *C09J 7/29* | (2018.01) | |
| *C09J 7/40* | (2018.01) | |
| *C09J 7/21* | (2018.01) | |
| *C09J 7/24* | (2018.01) | |
| *C09J 7/26* | (2018.01) | |
| *C09J 7/25* | (2018.01) | |
| *C09J 7/38* | (2018.01) | |
| *B32B 27/14* | (2006.01) | |
| *C08K 3/38* | (2006.01) | |
| *C08K 3/36* | (2006.01) | |
| *C08K 3/34* | (2006.01) | |
| *C09J 7/20* | (2018.01) | |
| *C08K 3/22* | (2006.01) | |
| *C08K 3/26* | (2006.01) | |
| *C08K 3/30* | (2006.01) | |

(52) U.S. Cl.
CPC ................ *C09J 7/29* (2018.01); *B32B 27/14* (2013.01); *C08K 3/36* (2013.01); *C08K 3/38* (2013.01); *C09J 7/203* (2018.01); *C09J 7/21* (2018.01); *C09J 7/24* (2018.01); *C09J 7/25* (2018.01); *C09J 7/26* (2018.01); *C09J 7/38* (2018.01); *C09J 7/401* (2018.01); *C08K 3/34* (2013.01); *C08K 2003/2206* (2013.01); *C08K 2003/262* (2013.01); *C08K 2003/3045* (2013.01); *C08K 2003/3063* (2013.01); *C08K 2003/3081* (2013.01); *C09J 2203/326* (2013.01); *C09J 2301/122* (2020.08); *C09J 2301/302* (2020.08); *C09J 2301/312* (2020.08); *C09J 2301/41* (2020.08); *C09J 2400/123* (2013.01); *C09J 2400/143* (2013.01); *C09J 2400/163* (2013.01); *C09J 2423/00* (2013.01); *C09J 2423/041* (2013.01); *C09J 2423/101* (2013.01); *C09J 2425/00* (2013.01); *C09J 2427/001* (2013.01); *C09J 2433/001* (2013.01); *C09J 2463/00* (2013.01); *C09J 2467/001* (2013.01); *C09J 2467/006* (2013.01); *C09J 2475/001* (2013.01); *C09J 2483/005* (2013.01)

(58) Field of Classification Search
None
See application file for complete search history.

(56) References Cited

U.S. PATENT DOCUMENTS

| | | |
|---|---|---|
| 4,051,195 A | 9/1977 | McWhorter |
| 4,150,170 A | 4/1979 | Lazear et al. |
| 4,181,752 A | 1/1980 | Martens et al. |
| 4,330,590 A | 5/1982 | Vesley |
| 4,379,201 A | 4/1983 | Heilmann et al. |
| 4,391,687 A | 7/1983 | Vesley |
| 4,552,604 A | 11/1985 | Green |
| 4,576,999 A | 3/1986 | Eckberg |
| 4,678,846 A | 7/1987 | Weitemeyer et al. |
| 4,725,630 A | 2/1988 | Magee et al. |
| 4,978,726 A | 12/1990 | Döhler et al. |
| 6,833,668 B1 | 12/2004 | Yamada et al. |
| 6,871,419 B1 | 3/2005 | Becker et al. |
| 7,198,256 B2 | 4/2007 | Tatura et al. |
| 8,460,969 B2 | 6/2013 | Krawinkel et al. |
| 8,802,777 B2 | 8/2014 | Zöllner et al. |

(Continued)

FOREIGN PATENT DOCUMENTS

| | | |
|---|---|---|
| CN | 101084285 A | 12/2007 |
| CN | 104220549 A | 12/2014 |

(Continued)

*Primary Examiner* — Frank D Ducheneaux
(74) *Attorney, Agent, or Firm* — Norris McLaughlin, P.A.

(57) ABSTRACT

The aim is to provide an adhesive tape that effectively protects an electronic construction from permeants, especially water, and that at the same time has good gap-filling qualities. To solve this problem an adhesive tape is proposed that has in the following order:—a carrier layer without barrier effect at least towards water and with a WVTR of at least 1 g/(m²*d) (38° C., 90% relative humidity, 50 μm layer thickness); —a layer comprising at least one getter material capable of sorbing at least water; —a water barrier ply; and—a layer of pressure-sensitive adhesive, where the carrier layer bears an outward-facing release layer and/or the layer of pressure-sensitive adhesive is lined with a release liner which has a release layer lying on the layer of pressure-sensitive adhesive.

11 Claims, No Drawings

(56) References Cited

U.S. PATENT DOCUMENTS

| | | |
|---|---|---|
| 8,846,169 B2 | 9/2014 | McCormick et al. |
| 9,505,959 B2 | 11/2016 | Grittner et al. |
| 9,593,263 B2 | 3/2017 | Keite-Telgenbüscher et al. |
| 9,627,646 B2 | 4/2017 | Ellinger et al. |
| 9,714,366 B2 | 7/2017 | Lühmann et al. |
| 10,323,163 B2 | 6/2019 | Keite-Telgenbuescher et al. |
| 2003/0057574 A1 | 3/2003 | Boroson et al. |
| 2004/0056397 A1 | 3/2004 | Tatura et al. |
| 2004/0104673 A1 | 6/2004 | Hosokawa et al. |
| 2004/0169174 A1 | 9/2004 | Huh et al. |
| 2004/0216778 A1 | 11/2004 | Ferri et al. |
| 2009/0100299 A1 | 4/2009 | Betawar et al. |
| 2010/0014162 A1 | 1/2010 | Bunde et al. |
| 2010/0068514 A1 | 3/2010 | Ellinger et al. |
| 2010/0104864 A1 | 4/2010 | Zöllner et al. |
| 2010/0137524 A1 | 6/2010 | Grittner et al. |
| 2010/0148127 A1 | 6/2010 | Ellinger et al. |
| 2010/0272933 A1 | 10/2010 | McCormick et al. |
| 2011/0121356 A1 | 5/2011 | Krawinkel et al. |
| 2011/0274843 A1 | 11/2011 | Grittner et al. |
| 2013/0183471 A1 | 7/2013 | Lühmann et al. |
| 2014/0170326 A1 | 6/2014 | Grittner et al. |
| 2014/0363603 A1 | 12/2014 | Keite-Telgenbüscher et al. |
| 2015/0099081 A1 | 4/2015 | Bai et al. |
| 2015/0337174 A1 | 11/2015 | Keite-Telgenbuscher et al. |
| 2016/0336513 A1 | 11/2016 | Keite-Telgenbüscher et al. |
| 2017/0313909 A1 | 11/2017 | Lühmann et al. |

FOREIGN PATENT DOCUMENTS

| | | |
|---|---|---|
| CN | 105164222 A | 12/2014 |
| DE | 33 16 166 A1 | 11/1983 |
| DE | 38 20 294 C1 | 10/1989 |
| DE | 196 46 048 A1 | 5/1998 |
| DE | 199 13 761 A1 | 9/2000 |
| DE | 10 2008 047 964 A1 | 3/2010 |
| DE | 10 2008 052 625 A1 | 4/2010 |
| DE | 10 2008 059 050 A1 | 5/2010 |
| DE | 10 2008 062 130 A1 | 6/2010 |
| DE | 10 2008 060 113 A1 | 7/2010 |
| DE | 10 2012 224 310 A1 | 6/2014 |
| EP | 0 232 060 A2 | 8/1987 |
| EP | 0 168 713 B1 | 9/1991 |
| EP | 0 573 570 B1 | 10/1996 |
| EP | 1 407 818 A1 | 4/2004 |
| EP | 2 607 439 A1 | 6/2013 |
| JP | H04 296381 A | 10/1992 |
| JP | H07 169567 A | 7/1995 |
| JP | 2004-351612 | 12/2004 |
| JP | 2005-298703 A | 10/2005 |
| KR | 10-2015-0097798 A | 8/2015 |
| WO | 98/01910 A1 | 1/1998 |
| WO | 98/21287 A1 | 5/1998 |
| WO | 03/002684 A1 | 1/2003 |
| WO | 03/008837 A1 | 1/2003 |
| WO | 03/065470 A1 | 8/2003 |
| WO | 2007/087281 A1 | 8/2007 |
| WO | 2008/036707 A1 | 3/2008 |
| WO | 2008/122489 A1 | 10/2008 |
| WO | 2009/086095 A1 | 7/2009 |
| WO | 2013/091911 A1 | 6/2013 |
| WO | 2014/095387 A1 | 6/2014 |
| WO | 2015/106940 A1 | 7/2015 |

ADHESIVE TAPE FOR ENCAPSULATING ELECTRONIC CONSTRUCTIONS

This application is a 371 of PCT/EP2017/067986, filed Jul. 17, 2017, which claims foreign priority benefit under 35 U.S.C. § 119 of the German Patent Application No. 10 2016 213 840.5, filed Jul. 27, 2016, the disclosures of which are incorporated herein by reference.

The present invention concerns the technical field of encapsulation materials for the protection of electronic devices. An adhesive tape structure suitable for this purpose is proposed, which in particular makes it possible to use soft adhesives and at the same time to maintain a protective function against substances capable of permeation.

Optoelectronic devices are used to an ever-increasing extent in commercial products or are soon to be marketed. Such devices comprise inorganic or organic electronic structures, for example organic, organometallic or polymeric semiconductors, or combinations thereof. Depending on the desired application, the corresponding products are configured to be rigid or flexible, and there is an increasing demand for flexible devices. The production of such devices is often carried out by means of printing processes such as relief printing, gravure printing, silkscreen printing, planographic printing, or also so-called "non-impact printing" processes such as e.g. thermal transfer printing, inkjet printing or digital printing. In many cases, however, vacuum processes such as e.g. chemical vapor deposition (CVD), physical vapor deposition (PVD), plasma-enhanced chemical or physical vapor deposition (PECVD), sputtering, (plasma) etching or evaporation are also used. As a rule, structuring is carried out using masks.

As examples of optoelectronic applications that are already commercially available or show significant market potential, one can mention here electrophoretic or electrochromic structures or displays, organic or polymeric light-emitting diodes (OLEDs or PLEDs) in indicating and display devices or as lighting, further electroluminescent lamps, light-emitting electrochemical cells (LEECs), organic solar cells such as dye or polymer solar cells, inorganic solar cells, in particular thin-layer solar cells, for example based on silicon, germanium, copper, indium and selenium, organic field effect transistors, organic switching elements, organic optical amplifiers, organic laser diodes, organic or inorganic sensors, or also organically or inorganically-based RFID transponders.

The technical challenge in achieving sufficient service life and functions of optoelectronic devices in the field of inorganic and organic optoelectronics, most particularly organic optoelectronics, is that of protecting the components contained therein from permeants. As a rule, permeants are considered to be gaseous or liquid substances that penetrate into a solid and may pass or migrate therethrough. Accordingly, many low-molecular-weight organic or inorganic compounds can be permeants, with water vapor being of particular importance in the context described herein.

A large number of optoelectronic devices—particularly in use of organic materials—are sensitive both to water vapor and oxygen. During the service life of the electronic devices, therefore, protection by means of encapsulation is required, as performance otherwise deteriorates over the period of application. In the absence of sufficient protection, for example, luminosity can decrease due to oxidation or hydrolysis processes in the case of electroluminescent lamps (EL lamps) or organic light-emitting diodes (OLEDs), contrast can decrease in the case of electrophoretic displays (EP displays), or efficiency can decrease in the case of solar cells, to a dramatic degree within a short period of time.

In the field of inorganic and in particular organic optoelectronics, there is therefore a great demand for flexible adhesive solutions that constitute a barrier to permeants such as oxygen and/or water vapor. Several approaches to such adhesive solutions can already be found in the prior art.

For example, liquid adhesives based on epoxides are frequently used as barrier adhesives, such as those described for example in WO 98/21287 A1, U.S. Pat. Nos. 4,051,195 and 4,552,604. Their main area of application is as edge adhesives for rigid devices, but also for moderately flexible devices. Curing is carried out thermally or by means of UV radiation.

However, the use of these liquid adhesives is accompanied by a series of unwanted effects. For example, low-molecular-weight components (VOCs—volatile organic compounds) can damage the sensitive structures of the device and make production more difficult. Moreover, the adhesive must be applied to each individual component of the device in a complex procedure. Expensive dispensers and fixation devices must be procured in order to ensure precise positioning. In addition, the method of application hinders a rapid continuous process. In the subsequently required lamination step, it can be difficult to achieve a specified layer thickness and adhesion width due to the low viscosity.

An alternative is the use of pressure-sensitive or hot-melt adhesives for sealing of optoelectronic structures. Among the pressure-sensitive adhesives, it is preferable to use those that can be cured after bonding by means of energy input (such as actinic radiation or heat). Such adhesive compositions are described for example in US 2006/0100299 A1 and WO 2007/087281 A1. They are advantageous in particular because the barrier effect of the adhesives can be improved by crosslinking.

The use of hot-melt adhesives is also known in the prior art. In many cases, copolymers of ethylene are used, for example ethylene ethyl acetate (EEA), ethylene acrylic acid copolymer (EAA), ethylene butyl acrylate (EBA) or ethylene methyl acrylate (EMA). In particular, for solar cell modules based on silicon wafers, crosslinking ethylene vinyl acetate (EVA) copolymers are generally used. Crosslinking is carried out during the sealing process under pressure and at temperatures above approximately 120° C. This process is disadvantageous for many optoelectronic structures based on organic semiconductors or produced in thin-layer processes because of the high temperatures and mechanical stress due to the pressure.

Hot-melt adhesives based on block copolymers or functionalized polymers are described for example in WO 2008/036707 A2, WO 2003/002684 A1, JP 2005-298703 A and US 2004/0216778 A1. An advantage of these adhesives is that no or only very small amounts of materials that damage the structure itself are brought into the structure to be encapsulated by the adhesives, while this problem is relevant primarily in reactive liquid adhesive systems, in particular acrylate- or epoxy-resin-based systems. Because of the high number of reactive groups, the latter systems show relatively high polarity, so that in particular water is contained therein. As a rule, the amount is in the range of less than 100 ppm to greater than 1%. For reasons such as this, such liquid adhesives are primarily used for edge sealing of electronic devices, wherein they are not in direct contact with the active electronic materials.

A further possibility for dealing with the problem of introduced permeants is to additionally include another absorbent material inside the encapsulation—a so-called getter—that binds the water or other permeants diffusing from the adhesive or permeating therethrough, for example by absorbing or adsorbing them. Such a process is mentioned among other sources in EP 1407818 A1, US 2003/0057574 A1 and US 2004/0169174 A1. In addition, imparting permeant-binding substances or properties to an adhesive is also discussed for example in JP 07-169567, WO 98/01910 A1, WO 03/088371 A2, US 2004-0104673 A1, WO 03/065470 A1, JP 04-296381, US 6833668, DE 102008062130 A1, DE 102008060113 A1 and DE 102008047964 A1.

DE 19646048 A1 describes a package laminate for transdermal therapeutic systems that comprises a drying agent dispersed in a flat layer, wherein this layer is fastened to the package laminate by means of an adhesive-coated film. The package laminate dries the gas space in the package.

DE 19913761 A1 describes a flat drying device for drying a surrounding gas space that comprises a matrix containing a drying agent, wherein the matrix can also be a pressure-sensitive adhesive.

A general drawback of an adhesive with getter material distributed therein is impairment of the adhesive properties by the getter material. For example, the getter material can occupy area on the contact surface of the substrate to be glued, which is then no longer available for adhesion. In addition, in encapsulation of electronic devices, the getter material can come into direct contact with the device and damage it as a result of its reactivity.

WO 2009/086095 A2 describes an encapsulation system comprising a flexible barrier film, an adhesive that is at least partially applied to the barrier film, and a drying agent that is applied to at least part of the barrier film or the adhesive. A drawback is the complex production of a layer structure in this method.

It is further possible to use raw materials with particularly low levels of permeants or to remove permeating substances from the adhesive during production or before application, for example by thermal drying, vacuum drying, freeze drying or mixing in of getters. The drawbacks of such methods are the long drying time and the high or low drying temperatures, as the case may be, which can damage the adhesive or trigger chemical reactions, such as e.g. cross-linking. The process of mixing in and later separation of the getter is also complex.

If such measures are taken on the adhesive side in order to reduce the introduction of harmful permeating substances into the structure to be protected, it is necessary to keep the resulting properties as unrestricted as possible until the adhesive is used. For example, it is necessary to protect an adhesive designed in particular to be anhydrous from water sorption from the environment.

As a rule, this object is achieved by means of impermeable or at least permeation-inhibiting packaging of the adhesives. As a rule, liquid adhesives are placed in corresponding receptacles, composed for example of metal. Adhesive tapes are often heat-sealed into flexible bags composed of permeation-inhibiting material—for example, polyethylene film or a film laminate of aluminum and polyester. The packaging materials themselves must also be as free as possible of any permeants that could be released toward the filling material side.

In order to counteract weaknesses in the tightness of the package or to rapidly bind enclosed permeants, a getter is often included in the package, for example in the form of a bag filled with a silica gel or zeolite. As a rule, this getter is not in direct contact with the filling material. A particular drawback of this method is the increased complexity of packaging.

A specific problem occurs in packaging of flat adhesives, i.e. adhesive tapes or adhesive films: if these are stacked or rolled up as cut sections, gas—for example air—is enclosed therein, which is not exchanged with the gas space remaining inside the package. The result is that unwanted permeants contained therein, for example water vapor, are not absorbed by the getter material located in the package and can thus get into the adhesive. In addition, such adhesive tapes generally comprise a temporary covering material, the so-called liner, and often a carrier material as well. These can also contain unwanted permeants, which, because of the large contact area with the adhesive, can easily permeate said adhesive. Getter bags or pads inserted into the package cannot reliably capture and bind these permeants. The process of completely removing the unwanted permeants from the liner and carrier materials, for example by drying, is lengthy and complex.

As a way of solving this problem, on the one hand, WO 2014/095387 A1 describes adhesive tapes that comprise a getter material in one of their central layers. On the other hand, WO 2013/091911 A1 and EP 2607439 A1 describe release liners that comprise getter materials and can therefore absorb permeants both from the adhesive tape itself and from the environment. However, the latter solution in particular gives rise to a further problem: adhesive tapes must often bridge cracks or gaps in the substrates to be glued. In order to prevent this from causing weakening of the adhesive bond, the adhesives must also fill these cracks or gaps, i.e. they must show a rather soft consistency. A release liner having a strong separating action is needed for such adhesives. Now, when a release liner comprises getter materials, these increase the thickness of the release liner as a rule. However, this adversely effects the removability of an adhesive with favorable "gap-filling" properties. It generally applies that the thinner a liner is, the easier it is to remove. However, the additional "getter material" that is a component of the liner increases its thickness and thus counteracts any improvement in the removability of the liner from the adhesive.

The present invention addresses this problem in particular. The aim is to provide an adhesive tape that effectively protects an electronic structure from permeants, in particular water, and simultaneously shows favorable "gap-filling" properties. In order to achieve this object, a special layer structure in a multilayer adhesive tape is proposed. A first and general subject matter of the invention is an adhesive tape for encapsulating electronic structures that comprises, in the following order:
  a carrier layer without a barrier effect, at least against water, having a WVTR of at least 1 $g/(m^2*d)$ (38° C., 90% relative humidity, 50 μm layer thickness);
  a layer containing at least one getter material capable of sorption at least of water;
  a layer having a barrier effect against water; and
  a pressure-sensitive adhesive layer,
wherein an outward-facing release layer lies on the carrier layer and/or the pressure-sensitive adhesive layer is lined with a release liner that has a release layer lying on the pressure-sensitive adhesive layer. It has been found that when the adhesive tape is stored as a roll or in a stack, the indirect contact between the release layer or release liner and the getter-containing layer on the rear side of the carrier is sufficient to adjust the pressure-sensitive adhesive layer to a permeant content, in particular a water content, of less than 100 ppm. One can advantageously dispense with a relatively thick and thus heavy liner that is removable from the pressure-sensitive adhesive.

According to the invention, an adhesive tape is considered to be a flat structure, i.e. a structure that is substantially extended in two dimensions. Tapes with extended length and limited width, tape sections, labels, blanks and the like are therefore included in the term "adhesive tape". The release layer lying on the carrier layer—if present—is considered to be a component of the adhesive tape because it is part of the layer composite thereof. Conversely, the release liner lying on the pressure-sensitive adhesive layer—if present—is not considered to be a component of the adhesive tape, as it is provided only for temporary protection of the pressure-sensitive adhesive and for the removal thereof before application of the adhesive tape. The liner thus differs sharply from the further layers of the adhesive tape in the bonding strength it imparts to the layer structure.

The adhesive tape according to the invention comprises a carrier layer without a barrier effect, at least against water. The term "without a barrier effect, at least against water" means that the layer is permeable to water in any case and optionally to further permeants. Typically, such carrier layers show WVTR values of greater than 1 g/(m$^2$*d), according to the invention more preferably greater than 10 g/(m$^2$*d), in each case measured at 38° C. and 90% relative humidity and based on a layer thickness of 50 µm. If carrier layers without a barrier effect at least against water having WVTR values of less than 100 g/(m$^2$*d) are used, the thickness of the carrier layer in question is preferably less than 70 µm, and more preferably less than 30 µm. These parameters facilitate the permeation of water and optionally further permeants into the getter-material-containing layer and thus allow absorption of the permeants by the getter material.

The material of the carrier layer without a barrier effect at least against water is generally not critical, provided it has the required permeability at least for water. Carrier layers of metal, ceramics or glass are therefore unsuitable. The material of the carrier layer without a barrier effect at least against water is preferably selected from the group composed of polymer films, papers, woven fabrics, nonwovens, film composites and combinations of these materials. Particularly preferably, the material of the carrier layer without a barrier effect at least against water is a single or multilayer polymer film. For this purpose, a multilayer film structure can be generated by coextrusion, lamination by means of an adhesive or by extrusion coating. The polymer film preferably comprises polymers selected from the group composed of: polyethylenes, in particular HDPE, MDPE, LDPE, LLDPE, and co- and block copolymers of ethylene; polypropylenes, in particular oriented polypropylene (OPP) produced by mono- or biaxial stretching, wherein HOMO-PP, HECO-PP or rPP are used as polymers; ionomers based on ethylene or propylene; MSA-grafted polymers; cyclic olefin copolymers (COO); polyvinyl chloride (PVC); polyesters, in particular biaxially stretched polyethylene terephthalate (PET) and polyethylene naphthalate (PEN); ethylene vinyl alcohol (EVOH); polyethylene vinyl acetate (EVA); polyvinylidene chloride (PVDC); polyvinylidene fluoride (PVDF); polyacrylonitrile (PAN); polycarbonate (PC); polyamide (PA); cellulose acetate; polymethyl methacrylate (PMMA); polyvinyl alcohol; polyurethane (PU); polyethersulfone (PES) and polyimide (PI). The polymers can be used as a 100% system, as a blend with an additional one or more of the above-mentioned polymers and/or in combination with further additives such as e.g. fillers, antioxidants, lubricants, antiblocking agents, dyes and/or pigments.

Most particularly preferably, the material of the carrier layer without a barrier effect at least against water is a single or multilayer polymer film that comprises a polymer selected from the group composed of PET, PVC, PEN, PC and PU and combinations of the above-mentioned polymers.

The adhesive tape according to the invention further comprises a layer containing at least one getter material capable of sorption at least of water. A "getter material" is understood to be a substance that is capable of absorption (sorption) of one or a plurality of substance(s) capable of permeation. The sorption of the substance(s) capable of permeation through the getter material can take place for example by absorption or adsorption, wherein adsorption can occur in the form of both chemisorption and physisorption. The getter material could therefore also be referred to as a "sorbent" or a "sorption agent".

A "substance capable of permeation" is understood to refer to a substance which, as a gaseous or liquid, optionally also as a solid, substance, can penetrate into the pressure-sensitive adhesive layer of the adhesive tape according to the invention and then pass through it. Such substances are also referred to as "permeants". The permeants can originate from the adhesive tape or the pressure-sensitive adhesive itself or from the environment. Frequently, low-molecular-weight organic compounds such as solvent residues, residual monomers, oils, resin components, plasticizers and in particular water originate from the adhesive itself. Water, volatile organic compounds (VOCs), low-molecular-weight hydrocarbons and oxygen often originate from the environment. The following substances in particular are considered to be "substances capable of permeation" or "permeants":

acetonitrile, 1-butanol, chlorobenzene, chloroform (trichloromethane), cyclohexane, diethyl ether, 1,4-dioxane, glacial acetic acid (acetic acid), acetic anhydride, acetic acid ethyl ester (ethyl acetate, acetic ester), acetic acid n-butyl ester (n-butyl acetate), acetic acid tert-butyl ester (t-butyl acetate), ethanol, methanol, n-hexane, n-heptane, 3-hexanone, 2-propanol (isopropanol), 3-methyl-1-butanol (isoamyl alcohol), methylene chloride (dichloromethane), methyl ethyl ketone (butanone), methyl isobutyl ketone, nitromethane (nitrocarbol), n-pentane, 2-pentanone, 3-pentanone, petroleum ether (light naphtha), benzine, propanol, pyridine (azine), tert-butyl methyl ether, tetrachloroethene (perchloroethene), tetrahydrofuran, toluene, trichloroethane, triethylamine, xylene, oxygen, methane, ethane, propane, propene, butane, butene, carbon dioxide, ozone, sulfur dioxide and in particular water.

Examples of suitable getter materials include: salts such as cobalt chloride, calcium chloride, calcium bromide, lithium chloride, lithium bromide, magnesium chloride, barium perchlorate, magnesium perchlorate, zinc chloride, zinc bromide, aluminum sulfate, calcium sulfate, copper sulfate, barium sulfate, magnesium sulfate, lithium sulfate, sodium sulfate, cobalt sulfate, titanium sulfate, sodium dithionite, sodium carbonate, sodium sulfate, potassium disulfite, potassium carbonate, magnesium carbonate; phyllosilicates such as montmorillonite and bentonite; metal oxides such as barium oxide, calcium oxide, iron oxide, magnesium oxide, sodium oxide, potassium oxide, strontium oxide, aluminum oxide (activated alumina) and titanium dioxide; further carbon nanotubes, activated charcoal, phosphorus pentoxide and silanes; readily oxidizable metals such as e.g. iron, calcium, sodium and magnesium; metal hydrides such as e.g. calcium hydride, barium hydride, strontium hydride, sodium hydride and lithium aluminum hydride; hydroxides such as potassium hydroxide and sodium hydroxide; metal complexes such as e.g. aluminum acetyl acetonate; furthermore, silicas such as e.g. silica gel; diatomaceous earth; zeolites; moreover, organic absorbers, for example polyolefin copolymers, polyamide copolymers, PET copolyesters, anhydrides of mono- and polycarboxylic acids such as acetic anhydride, propionic acid anhydride, butyric anhydride or methyl tetrahydrophthalic anhydride or further hybrid-polymer-based absorbers, which are primarily used in combination with catalysts such as e.g. cobalt; further organic absorbers such as e.g. weakly-crosslinked polyacrylic acid, polyvinyl alcohol, ascorbates, glucose, gallic acid or unsaturated fats and oils. Further substances that can advantageously be used, in particular for binding oxygen, include metalorganic oxidation additives based on chelating amines and transition metal complexes, in particular in combination with oxidizable substrate materials.

Mixtures of two or more getter materials can also be used according to the invention.

In accordance with their function, the getter materials are preferably used as materials that are substantially free of permeants, for example anhydrous. This distinguishes getter materials from similar materials used as fillers. For example, silica is frequently used as a filler in the form of pyrogenic silicic acid. However, if this filler is stored in the conventional manner under environmental conditions, it absorbs water from the environment and is no longer functional as a getter material to a technically usable extent. Only silica that is dried or kept dry can be used as a getter material. However, it is also possible according to the invention to use complexed materials that already partially comprise permeants, for example $CaSO_4 * \frac{1}{2}H_2O$ (calcium sulfate hemihydrate) or partially hydrogenated silicas, which by definition are present as compounds of the general formula $(SiO_2)_m * H_2O$.

"Silanes" are understood to refer to compounds of the general formula $R_a$—Si—$X_{4-a}$ or partial condensation products thereof. In the formula, a denotes an integer from 0 to 3, preferably 0 or 1. X denotes a hydrolyzable group, for example and preferably a halogen atom, in particular chlorine, an alkoxy group such as e.g. a methoxy, ethoxy, n-propoxy, iso-propoxy, n-butoxy, sec-butoxy or tert-butoxy group or an acetoxy group. Further examples known to the person having ordinary skill in the art of hydrolyzable groups can also be used within the meaning of the present invention. If a plurality of substituents X is present, they may be the same or different. R denotes an optionally substituted hydrocarbon radical, for example a methyl, ethyl, n-propyl, iso-propyl, n-butyl, sec-butyl, tert-butyl group, a pentyl group and branched isomers thereof, a hexyl group and branched isomers thereof, a heptyl group and branched isomers thereof, an octyl group and branched isomers thereof, a nonyl group and branched isomers thereof, a decyl group and branched isomers thereof, an undecyl group and branched isomers thereof, a dodecyl group and branched isomers thereof, a tetradecyl group and branched isomers thereof, a hexadecyl group and branched isomers thereof, an octadecyl group and branched isomers thereof or an eicosyl group and branched isomers thereof. The hydrocarbon radicals can additionally comprise ring-shaped and/or aromatic components. Representative structures of this type are cyclohexyl, phenyl and benzyl groups. Optionally, the hydrocarbon radical(s) R comprise(s) for example one or more heteroatom-containing substituents such as amino groups, aminoalkyl groups, glycidyl oxy groups, (meth)acryloxy groups and the like. If a plurality of substituents R is present, these can be the same or different from one another.

Preferably, the getter material is selected from the group composed of cobalt chloride, calcium chloride, calcium bromide, lithium chloride, lithium bromide, magnesium chloride, barium perchlorate, magnesium perchlorate, zinc chloride, zinc bromide, aluminum sulfate, calcium sulfate, copper sulfate, barium sulfate, magnesium sulfate, lithium sulfate, sodium sulfate, cobalt sulfate, titanium sulfate, sodium carbonate, sodium sulfate, potassium carbonate, magnesium carbonate; diatomaceous earth, silicas (silica), zeolites, phyllosilicates;

iron, calcium, sodium, magnesium, barium oxide, calcium oxide, iron oxide, magnesium oxide, sodium oxide, titanium dioxide, potassium oxide, strontium oxide, activated aluminum oxide;

carbon nanotubes, activated charcoal, phosphorus pentoxide, silanes;

calcium hydride, barium hydride, strontium hydride, sodium hydride and lithium aluminum hydride, potassium hydroxide, sodium hydroxide, aluminum acetyl acetonate;

polyolefin copolymers, polyamide copolymers, PET copolyesters;

acetic anhydride, propionic anhydride, butyric anhydride, methyl tetrahydrophthalic anhydride; and polyacrylic acid and polyvinyl alcohol, as these materials are particularly well-suited as water getters.

Particularly preferably, the getter material is selected from the group composed of cobalt chloride, calcium chloride, calcium bromide, lithium chloride, lithium bromide, magnesium chloride, barium perchlorate, magnesium perchlorate, zinc chloride, zinc bromide, aluminum sulfate, calcium sulfate, copper sulfate, barium sulfate, magnesium sulfate, lithium sulfate, sodium sulfate, cobalt sulfate, titanium sulfate, sodium carbonate, sodium sulfate, potassium carbonate, zeolites, calcium, magnesium, barium oxide, calcium oxide, magnesium oxide, sodium oxide, potassium oxide, strontium oxide, activated charcoal, phosphorus pentoxide, silanes, calcium hydride, barium hydride, strontium hydride, sodium hydride and lithium aluminum hydride, potassium hydroxide, sodium hydroxide, acetic anhydride, propionic anhydride, butyric anhydride, methyl tetrahydrophthalic anhydride, carbodiimides and mixtures of two or more of the above-mentioned substances. In addition to a strong tendency to sorb water, these materials also show a particularly high sorption capacity with respect to water.

"Carbodiimides" are understood to be compounds of the general formula $R^1$—N=C=N—$R^2$, where $R^1$ and $R^2$ are organic radicals, in particular alkyl or aryl radicals, that may be the same or different.

The getter material is preferably selected from the group of absorbent or adsorbent materials. Most particularly preferably, the getter material is selected from the group composed of calcium chloride, calcium oxide, boron trioxide, sodium sulfate, potassium carbonate, copper sulfate, magnesium perchlorate, magnesium sulfate, zeolites and mixtures of two or more of the above-mentioned substances. These getter materials offer the advantage of being easy to incorporate into the layer, having a high sorption capacity, and being regenerable getter materials. These are understood to include substances that under certain conditions, after having absorbed permeants, in particular water, can release these permeants and thus return to a state in which they are again capable of absorbing permeants.

For certain applications in which particularly strong binding of the absorbed permeants is desired, absorbent getter materials are preferred. Particularly preferred absorbent getter materials are metal oxides such as barium oxide, calcium oxide, iron oxide, magnesium oxide, sodium oxide, potassium oxide, strontium oxide and metal hydrides such as e.g. calcium hydride, barium hydride, strontium hydride, sodium hydride and lithium aluminum hydride.

In an embodiment of the invention, the getter material is present in the getter-material-containing layer in the form of particles. This means that, within the meaning of DIN 53206-1: 1972-08, the getter is present in the form of primary particles, aggregates and agglomerates.

The particle size of the getter particles is substantially determined or limited by the requirements for thickness of the layer comprising the particles or the entire adhesive tape according to the invention. Approximately 2000 µm can be considered as an upper limit for particle size. Preferably, the maximum particle size of the getter material is 100 µm. The term "particle size" is understood to refer to the maximum extension of a particle. Determination of particle size is preferably carried out by means of laser diffraction according to ISO 13320 (wherein agglomerates are dispersed in the dispersion step, but not aggregates), but other methods known to the person having ordinary skill in the art are also generally suitable.

In a special embodiment, the getter material is in particulate and nanoscale form. This means that the maximum particle size is less than 500 nm, preferably less than 200 nm and in particular less than 100 nm.

Preferably, the getter material is present in the getter-material-containing layer in particulate form and is partially enclosed by a matrix material. The term "matrix material" is understood to refer to a material that partially or completely encloses any getter material present, in particular a particulate getter material, and is different from the material of the further layers of the adhesive tape. Particularly preferably, the getter material is in the form of a dispersed phase, i.e. it is enclosed by a matrix material that forms the continuous phase of the dispersion.

In an embodiment, the getter material is in the form of a dispersed phase in an adhesive. Accordingly, the matrix material is preferably an adhesive, particularly preferably a pressure-sensitive adhesive, in particular a thermally cross-linked polyacrylate pressure-sensitive adhesive processed from the melt or a photopolymerized polyacrylate pressure-sensitive adhesive. In this way, the properties of the getter-material-containing layer can be optimized with respect to their intended function in the composite. For example, the pressure-sensitive adhesive can allow particularly simple dispersion of the getter material in the matrix material or can be particularly permeable to permeants so that they can quickly reach the getter material.

Particularly advantageous is an embodiment of a pressure-sensitive adhesive containing the dispersed getter material as a viscoelastic carrier, e.g. based on thermally crosslinkable polyacrylates processed from the melt as described in WO 2008/122489 A1, DE 102008052625 A1 or DE 102008059050 A1, or based on photopolymerizable acrylates as described in U.S. Pat. Nos. 4,150,170, 4,181,752, 4,330,590, 4,379,201, 4,391,687 or EP 0573570 B1. Extremely high bonding performance can be achieved by means of such an embodiment of the adhesive tape according to the invention.

If the getter material is in particulate form and is at least partially enclosed by a matrix, the getter-material-containing layer is preferably 5 µm to 3000 µm thick. As the adhesive tape according to the invention remains in the product structure, lower layer thicknesses of up to 200 µm are particularly preferred. If only low sorption capacity is required or the adhesive tape is to be as flexible as possible, a thickness of 5 to 100 µm is preferred. If a high sorption capacity is required, a thickness of 100 to 200 µm is preferred. For many applications, a reasonable compromise between flexibility (thin layer) and sorption capacity (thick layer) is in the range of 20 to 70 µm, and in particular, therefore, the layer thickness of the getter-material-containing layer is 20 to 70 µm.

The getter material can also be present in the pores of a porous carrier material. The getter material does not completely fill the pores, but is only fixed therein—for example geometrically—, so that the getter-filled carrier material is highly gas-permeable. This is advantageous in that permeants that migrate in can very rapidly reach the getter material, and at the same time the carrier material allows high inner strength of the layer composite to be achieved. Porous carrier materials are also particularly well-suited for absorption of liquid getter materials.

For example, textile flat structures, closed- and open-cell foams, or papers may be used as a porous carrier material. Particularly preferably, however, the porous carrier comprising getter material is an extruded and stretched film, e.g. on a polyolefin basis, as described in EP 0232060 A2. In this case, such a gas-permeable, porous film is substantially produced in the following steps:

a) mixing of a polymer resin and an inorganic getter material, b) forming of a film from the mixture and c) stretching of the film obtained in order to impart porosity.

As a result of the selection of a polyolefin as a polymer resin, there is only one weak anchorage between the two materials because of the polarity differences compared to the getter material. During stretching, this connection is at least partially dissolved, so that pores develop around the dispersedly distributed getter particles, which are characterized by particularly favorable accessibility of the getter material for permeants. After stretching, therefore, the getter material is no longer completely enclosed by the matrix material. Selection of a film as the carrier material also advantageously provides favorable punchability and applicability of the structure. Preferably, the stretched film filled with inorganic getter material has a thickness of less than 10 µm, and particularly preferably less than 5 µm. This advantageously allows the flexibility of the adhesive tape according to the invention to be increased.

A textile flat structure is understood to refer to flexible fiber structures, such as e.g. woven fabrics, laid fabrics, knitted fabrics, crocheted fabrics, nonwovens (solidified and unsolidified) and grids.

The getter-material-containing layer can generally comprise 0.5 to 98 wt % of getter material. Preferably, the layer contains 3 to 85 wt %, more preferably 10 to 60 wt % of getter material, and in particular 15 to 50 wt % of getter material, in each case based on the total weight of the layer. It has been found that in this content range, on the one hand, favorable getter capacities can be achieved, and, on the other, the mechanical properties of the layer remain sufficiently intact.

If the getter-material-containing layer is composed in addition to the getter material of a pressure-sensitive adhesive, or if the getter material is dispersed in a pressure-sensitive adhesive, amounts of between 0.5 to 40 wt % of getter material are preferred, as in this content range, one obtains sufficient adhesive strength of both the carrier layer without a barrier effect and the layer having a barrier effect.

Particularly stable adhesive strengths combined with a favorable getter effect are obtained in particular in the range of 9 to 35 wt % of getter material. Particularly preferably, the getter-material-containing layer therefore contains 9 to 35 wt % of getter material based on the total weight of the layer.

If reactive adhesives or hot-melt adhesives (hotmelts) are used, layers having significantly higher getter content can be produced, but at the cost of complexity in production. Here, amounts of between 0.5 and 85% are preferred, wherein especially with respect to thin layers with a high getter effect, amounts of between 40 to 85 wt % of getter material are particularly preferable.

Also preferably, the getter material is present in the form of particles in a particle size distribution in which at least 10 vol % exceed the average layer thickness of the getter-material-containing layer. This leads to a rough surface and can improve the anchorage of the different layers in the layer composite of the adhesive tape according to the invention.

Preferably, the getter material has, in its application form—i.e. for example as particulate material—a minimum permeant sorption capacity, in particular for water, of 1%, more preferably 2%, particularly preferably 5%, and in particular 10% of its net weight. Most particularly preferably, the getter material has a sorption capacity (maximum sorbable permeant weight) of >20% of its net weight, as this allows the content of getter to be kept low. The sorption capacity is determined after storage of the substantially permeant-free getter material in its application form over 100 h at 23° C. and 50% relative humidity for the permeant water vapor or at 23° C. in a saturated atmosphere for other gaseous permeants.

The permeant content of the getter after storage can be determined by gravimetry. From the standpoint of sorption capacity, the getter material is preferably selected from the group composed of copper sulfate, calcium oxide, calcium chloride and zeolites and mixtures of these materials.

The introduction of the getter material or the getter materials into the getter-material-containing layer can be carried out by all methods known to the person having ordinary skill in the art. The getter material can be present in solution, in dispersion, as a melt or as a fluid.

In addition to the getter material, and optionally the carrier material, the getter-material-containing layer can comprise further materials or substances, e.g. light-absorbing or light-scattering materials, UV absorbers or reflectors, color indicators that indicate saturation of the getter material, anti-aging agents and/or tackifiers, in particular adhesive resins.

The getter-material-containing layer can be directly applied from the solution, emulsion or dispersion by means of a coating method known to the person having ordinary skill in the art, e.g. using a coating bar. The solvent, emulsifier or dispersant used can in this case be evaporated in a conventional drying tunnel. Solvent-free coating, for example by means of scattering, flock coating or powdering methods, is also suitable.

According to the invention, the getter-material-containing layer can also be printed. Gravure and silkscreen printing methods according to the prior art are suitable for this purpose. Here, rotary printing methods are preferably used. Moreover, getter-material-containing layers can also be applied by spraying, optionally also with electrostatic support.

The adhesive tape according to the invention further comprises a layer having a barrier effect against water (also referred to below as a "barrier layer"). Such a barrier layer can be composed of organic or inorganic materials. The term "layer" means that this can be a single-layer or also a multilayer structure.

Preferably, the barrier layer comprises at least one inorganic barrier layer. Particularly suitable as inorganic barrier layers are metals deposited in a vacuum (for example by means of evaporation, CVD, PVD, PECVD) or under atmospheric pressure (for example by means of atmospheric-pressure plasma, reactive corona discharge or flame pyrolysis), for example aluminum, silver, gold, nickel and/or metal compounds such as metal oxides, nitrides or hydronitrides, for example oxides or nitrides of boron, aluminum, zirconium, hafnium or tellurium or also silicon and indium tin oxide (ITO). Layers of the above-mentioned variants doped with further elements are also suitable.

In order to ensure sufficient flexibility while at the same time avoiding crack formation in the inorganic barrier layer, such layers are generally thinner than approximately 50 nm. For this reason, and due to the high degree of compactness intended to hinder permeation, such layers are themselves not suitable as getter layers, as they do not provide sufficient sorption capacity for permeants.

Particularly preferably, the at least one getter-material-containing layer capable of sorption at least of water and one layer having a barrier effect against water, in particular an inorganic barrier layer, are configured as immediately successive layers. High-power impulse magnetron sputtering and atomic layer deposition, by means of which particularly impermeable layers can be produced with only minimal temperature loading of the substrate layer, can be mentioned as particularly suitable methods for application of an inorganic barrier layer.

Particularly preferably, the layer having a barrier effect against water is a composite of a polyurethane, polypropylene, polyethylene, polyvinyl chloride, polyvinylidene chloride, polyethylene-2,6-naphthalate, polyacrylonitrile, polyethylene terephthalate, ethylene vinyl alcohol copolymer, polyacrylate- or poly-ε-caprolactam film and at least one permeation-inhibiting layer arranged between this film and the pressure-sensitive adhesive layer, a metallic film, or a glass film. If a composite is used, the permeation-inhibiting layer faces the pressure-sensitive adhesive and the film faces the getter-material-containing layer.

Preferably, the barrier layer has a water vapor transmission rate (WVTR) of <1 $g/(m^2*d)$, where the value is based in each case on the thickness of the barrier layer used, i.e. is not standardized to a specific thickness. The WVTR is measured at 38° C. and 90% relative humidity according to ASTM F-1249.

The adhesive tape according to the invention also comprises a pressure-sensitive adhesive layer. The term "pressure-sensitive adhesive" is understood according to the invention, as is generally the case, to refer to a substance that—in particular at room temperature—is permanently tacky and adhesive. It is characteristic of a pressure-sensitive adhesive that it can be applied by pressure to a substrate and remains adhering thereto, wherein the pressure to be exerted and the duration of said pressure are not defined in further detail. In many cases, depending on the exact type of the pressure-sensitive adhesive, the temperature and humidity, and the substrate, it is sufficient to apply a brief, minimal pressure that does not exceed a light touch for a brief moment in order to achieve the adhesive effect, while in other cases, a longer application of high pressure may be necessary.

Pressure-sensitive adhesives have special characteristic viscoelastic properties that result in the permanent tackiness and adhesiveness. They are characterized in that when they are mechanically deformed, both viscous flow processes and elastic restoring forces are generated. The two processes are in a specified ratio to each other with respect to their respective proportions, said ratio depending both on the exact composition, the structure and the degree of crosslinking of the pressure-sensitive adhesive and on the speed and duration of deformation, as well as the temperature.

The proportional viscous flow is necessary in order to achieve adhesion. Only the viscous components, produced by macromolecules with relatively high mobility, allow favorable wetting and favorable flow onto the substrate to be bonded. A high proportion of viscous flow results in high intrinsic adhesiveness (also referred to as pressure-sensitive adhesiveness or surface tack) and thus often also in high adhesive force. Highly crosslinked systems and crystalline or glass-like solidified polymers generally show no or only minimal intrinsic adhesiveness due to a lack of flowable components.

The proportional elastic resilience forces are needed for achievement of cohesion. They are produced, for example, by very long-chain, highly entangled, and physically or chemically crosslinked macromolecules, and they allow the transmission of the forces which act on an adhesive bond. They are responsible for imparting to an adhesive bond the capacity to withstand a sustained load acting on it, in the form of a long-term shearing load, for example, to a sufficient extent and over a relatively long period of time.

For more precise description and quantification of the extent of the elastic and viscous components and the ratio of the components to one another, the variables of storage modulus (G') and loss modulus (G"), which can be determined by dynamic mechanical analysis (DMA), can be used. G' is a measure of the elastic component, and G" is a measure of the viscous component of a substance. Both variables are dependent on the deformation frequency and the temperature.

The variables can be determined by means of a rheometer. In this case, for example, the material to be tested is exposed in a plate/plate device to a sinusoidally oscillating shear stress. In the case of instruments operating with shear stress control, the deformation is measured as a function of time, and the time offset of this deformation relative to the introduction of the shear stress is measured. This time offset is referred to as phase angle δ.

The storage modulus G' is defined as follows: G'=(τ/γ)·cos(δ) (τ=shear stress, γ=deformation, δ=phase angle=phase shift between shear stress vector and deformation vector). The loss modulus G" is defined as follows: G"=(τ/γ)·sin(δ) (τ=shear stress, γ=deformation, δ=phase angle=phase shift between shear stress vector and deformation vector).

A substance is generally considered to be tacky and is defined as tacky within the meaning of the invention if at room temperature, here by definition at 23° C., in the deformation frequency range of $10^0$ to $10^1$ rad/sec, G' is at least partially in the range of $10^3$ to $10^7$ Pa and G" is also at least partially in this range. "Partially" means that at least one section of the G' curve is within the window described by the deformation frequency range of $10^0$ inclusive to $10^1$ inclusive rad/sec (abscissa) and the range of G' values of $10^3$ inclusive to $10^7$ Pa inclusive (ordinate). This applies correspondingly for G".

In general, all pressure-sensitive adhesives known to the person having ordinary skill in the art can be used in the pressure-sensitive adhesive layer, such as for example those based on acrylates and/or methacrylates, polyurethanes, natural rubbers, synthetic rubbers; styrene block copolymer compositions with an elastomer block composed of unsaturated or hydrogenated polydiene blocks such as e.g. polybutadiene, polyisoprene, copolymers of the two, polybutylene, in particular polyisobutylene, and further elastomer blocks known to the person having ordinary skill in the art; polyolefins, in particular poly-α-olefins and/or polyisobutylenes; fluoropolymers and/or silicones. The term "pressure-sensitive adhesive" also includes compositions having pressure-sensitive adhesive properties in the above sense. The pressure-sensitive adhesive of the pressure-sensitive adhesive layer can also be based on combinations and mixtures of a plurality of base polymers and on a pressure-sensitive adhesive comprising as additives adhesive resins, fillers, anti-aging agents, crosslinkers and/or further additives.

Preferably, the polymer base of the pressure-sensitive adhesive is selected from the group composed of styrene block copolymers, polyolefins and epoxy resins and mixtures of two or more of these polymers. The above-mentioned polymers are characterized by a high water vapor transmission rate and a low water content. In particular, the polymer base of the pressure-sensitive adhesives is selected from styrene block copolymers, polyisobutylenes and mixtures of these polymers. Among the polyolefins, polybutylene is particularly preferred, in particular polyisobutylene. The above-mentioned polymers are characterized by a high water vapor transmission rate and a low water content.

Preferably, at the time of production of the adhesive tape according to the invention or before it is used, i.e. before the absorption in question of the permeant from the material of the adhesive tape itself and from the environment begins, the pressure-sensitive adhesive layer has a permeant content, in particular a water content, of less than 2000 ppm, and particularly preferably less than 800 ppm. The unit ppm refers to the relation of the total weight of permeants contained to the adhesive weight under investigation. The permeant content can be determined by gas chromatography according to VDA 277, or in the case of water, according to DIN EN ISO 62 (gravimetric methods, Method 4) or DIN 53715 (Karl Fischer titration) after storage of the test piece for 24 h at 23° C. and 50% relative humidity. In the case of such low permeant contents of the pressure-sensitive adhesive, the capacity of the getter material of the getter layer is not greatly taxed by permeants already contained in the pressure-sensitive adhesive; rather, the getter-material-containing layer can fulfill its function as a collector of permeants originating from the environment.

The pressure-sensitive adhesive layer preferably shows a low permeation rate for the permeant to be immobilized. In the case of water vapor as a permeant, the water vapor transmission rate (WVTR) in each case is preferably less than 50 g/($m^2$*d), particularly preferably less than 25 g/($m^2$*d), based on an adhesive thickness of 50 μm. The WVTR is measured at 38° C. and 90% relative humidity according to ASTM F-1249, and the oxygen transmission rate (OTR) is measured at 23° C. and 50% relative humidity according to DIN 53380 Part 3.

Because of the low permeation rate of the pressure-sensitive adhesive, less permeant from the environment diffuses during storage of the adhesive tape in a rolled-up state or in a stack of a plurality of adhesive tapes through the pressure-sensitive adhesive into the getter-material-containing layer, which can therefore fulfill its function for a longer period of time or be provided with a smaller amount of getter material, thus reducing material input and cutting cost. This applies in particular to the production period of an adhesive tape according to the invention, during which it is not yet protected by a package or covering (e.g. a liner) from permeants diffusing in from the environment.

In order to optimize its properties, the pressure-sensitive adhesive layer of the pressure-sensitive adhesive layer can be mixed with one or more additives such as tackifying agents (resins), plasticizers, fillers, pigments, UV absorbers, light stabilizers, anti-aging agents, crosslinking agents, crosslinking promoters or elastomers.

The amount or the weight per unit area of the pressure-sensitive adhesive layer is preferably 1 to 2000 g/m$^2$, more preferably 10 to 100 g/m$^2$, wherein the terms "amount" or "weight per unit area" are understood to refer to the amount or the weight per unit area after any removal of water and/or solvent.

According to the invention, an outward-facing release layer lies on the carrier layer and/or the pressure-sensitive adhesive layer is covered with a release liner that has a release layer lying on the pressure-sensitive adhesive layer.

In an embodiment, the pressure-sensitive adhesive layer is covered with a release liner that has a release layer lying on the pressure-sensitive adhesive layer, wherein this release layer is a silicone, fluorinated silicone, silicone copolymer, fluoropolymer, polycarbamate or polyolefin release layer. Such a release liner provides improved protection of the pressure-sensitive adhesive from external influences such as dust; in addition, a release liner improves the punchability of the adhesive tape according to the invention.

In a further embodiment, a release layer facing outward lies on the carrier layer, and this release layer is a silicone release coating. Such a release coating forming part of the adhesive tape structure reduces the amount of waste material accumulated compared to an additional release liner, saves a step in the production process, namely laminating on of the release liner, and also saves a step for the customer, namely removal of the release liner. Of course, in such a structure, the adhesive force between the release layer and the pressure-sensitive adhesive layer of the adhesive tape must be less than the adhesive force between the pressure-sensitive adhesive layer and the layer having a barrier effect against water, because otherwise, in storage as a roll or in a stack, this would result in delamination of the adhesive tape rather than the desired unrolling or separation of the adhesive tape or the adhesive tape sections.

The release layer can generally comprise solvent-containing and/or solvent-free systems, with solvent-free systems being preferred. "Solvent-containing release coating" or "solvent-containing silicone-release system" means that the release system in question is applied as an actual solvent-containing system, but after crosslinking, which as a rule is thermally initiated, only trace amounts of the solvent at the most are present in the release system. The person having ordinary skill in the art nevertheless speaks of a "solvent-containing system" to refer to the special properties of such a solvent-based release coating.

The release agent can be radiation-crosslinking (UV- or electron-beam-), condensation- or addition-crosslinking, and it is preferably addition-crosslinking.

Systems are preferably used as release agents that are based on crosslinkable silicones. These include mixtures of crosslinking catalysts and so-called thermally curable condensation- or addition-crosslinking polysiloxanes. For condensation-crosslinking silicone systems, tin compounds such as dibutyl tin acetate are often present in the composition as crosslinking catalysts.

Silicone-based release agents on an addition-crosslinking basis can be cured by hydrosilylation. These release agents ordinarily comprise the following components:

an alkenylated polydiorganosiloxane (in particular linear polymers with terminal alkenyl groups),
a polyorganohydrosiloxane crosslinking agent and
a hydrosilylation catalyst.

For example, platinum or platinum compounds, such as e.g. Karstedt's catalyst (a Pt(O) complex compound), have become established as catalysts for addition-crosslinking silicone systems (hydrosilylation catalysts).

Furthermore, photoactive catalysts, so-called photoinitiators, can be used in combination with epoxide- and/or vinyl-ether-based UV-curable cationically crosslinking siloxanes or UV-curable radically crosslinking siloxanes such as e.g. acrylate-modified siloxanes. The use of electron-beam-curable silicone acrylates is also possible. Depending on the intended application, corresponding systems can also contain further additives such as stabilizers or flow control agents.

Photopolymerizable organopolysiloxane compositions can also be used. An example are compositions obtained by reacting organopolysiloxanes having hydrocarbon radicals that are substituted with (meth)acrylate groups and are directly bonded to the silicon atoms and crosslinked in the presence of a photosensitizer (cf. EP 0168713 B1 or DE 3820294 C1). One can also use compositions in which the crosslinking reaction between organopolysiloxanes having a hydrocarbon substituted with mercapto groups directly bonded to the silicon atoms and organopolysiloxanes with vinyl groups directly bonded to the silicon atoms is initiated in the presence of a photosensitizer. Such compositions are described for example in U.S. Pat. No. 4,725,630 A1.

For example, in use of the organopolysiloxane compositions described in DE 3316166 C1, which have hydrocarbon radicals that are substituted with epoxy groups and directly bonded to the silicon atoms, the crosslinking reaction is induced by releasing a catalytic amount of an acid obtained by photodecomposition of added onium salt catalysts. Other organopolysiloxane compositions that are curable by means of a cationic mechanism are materials that for example comprise propenyl oxysiloxane end groups.

Furthermore, fluorinated silicones and/or silicone copolymers can be used.

Particularly preferably, the release layer comprises a release system obtained by crosslinking an addition-crosslinking silicone system composed of a vinyl-functionalized polysiloxane as a base polymer, a methyl hydrogen siloxane as a crosslinker, and a platinum catalyst to a content of 92.5 to 99.5 wt %, based on the total weight of the release layer.

A further subject matter of the invention is the use of an adhesive tape according to the invention for encapsulating an electronic structure.

EXAMPLES

Test Methods

Unless otherwise indicated, all measurements are conducted at 23° C. and 50% relative humidity.
Adhesive Force
The adhesive forces on steel were determined analogously to ISO 29862 (Method 3) at 23° C. and 50% relative humidity with a peeling rate of 300 mm/min and a peeling angle of 180°. An etched PET film with a thickness of 50 μm, such as that available e.g. from the firm Coveme (Italy), was used as a reinforcing film. The measuring strip was adhesively bonded using a winding machine at a temperature of 23° C. The adhesive tapes were peeled off immediately after application. The measured value (in N/cm) was taken as the average of three individual measurements. The test was carried out on uncrosslinked samples.

Liner Release

The liner release forces were determined at 23° C. and 50% relative humidity with a peeling rate of 300 mm/min and a peeling angle of 180°. The measuring strip was adhesively bonded to a steel plate using a winding machine at a temperature of 23° C. The adhesive tapes were peeled off immediately after application. The measured value (in cN/cm) was taken as the average of three individual measurements. The test was carried out on uncrosslinked samples.

Water Vapor Transmission Rate (WVTR)

The water vapor transmission rate (WVTR) was determined according to DIN 53380 Part 3 or ASTM F-1249. For this purpose, the pressure-sensitive adhesive was applied to a permeable membrane with a layer thickness of 50 µm. The water vapor transmission rate was determined at 38° C. and a relative humidity of 90%. The test was carried out on crosslinked samples.

Adhesive Resin Softening Temperature

The adhesive resin softening temperature is measured according to the relevant method, which is known as the ring and ball method and is standardized according to ASTM E28.

The ring and ball unit HRB 754 from the firm Herzog was used to determine the adhesive resin softening temperature of the resins. The resin samples were first finely ground in a mortar. The resulting powder was placed in a brass cylinder with a bottom opening (inner diameter at the upper part of the cylinder 20 mm, diameter of the bottom opening of the cylinder 16 mm, cylinder height 6 mm) and melted on a hot table. The filling amount was selected so that the resin completely filled the cylinder after melting in a level manner.

The resulting test piece was placed together with the cylinder in the sample holder of the HRB 754. Glycerol was used to fill the heating bath in cases where the adhesive resin softening temperature was between 50° C. and 150° C. It was also possible to use a water bath at lower adhesive resin softening temperatures. The test balls had a diameter of 9.5 mm and weighed 3.5 g. In accordance with the HRB 754 procedure, the ball was arranged above the test piece in the heating bath and deposited on the test piece. A target plate was positioned 25 mm below the cylinder bottom, with a light barrier located 2 mm above the latter. During the measurement process, the temperature was increased at a rate of 5° C. per min. In the range of the adhesive resin softening temperature, the ball began to move through the bottom opening of the cylinder, finally coming to rest on the target plate. In this position, it was detected by the light barrier, and the temperature of the heating bath was recorded at this time. Double determination was carried out. The adhesive resin softening temperature is the average of the two individual measurements.

MMAP

MMAP, the mixed methylcyclohexane aniline cloud point, was determined using a modification of the ASTM C 611 method. Methylcyclohexane was used instead of the heptane used in the standard test method. The method uses resin/aniline/methylcyclohexane in a ratio of 1/2/1 (5 g/10 ml/5 ml); the cloud point is determined by cooling a heated, clear mixture of the three components until the point at which complete cloudiness occurs.

DACP

DACP, the diacetone cloud point, is determined by cooling a heated solution of 5 g of resin, 5 g of xylene and 5 g of diacetone alcohol until the point at which the solution becomes cloudy.

Water Content Measurement

The water content was determined according to DIN 53715 (Karl Fischer titration). Measurement was carried out on a Karl Fischer Coulometer 851 in combination with an oven sampler (oven temperature 140° C.). In each case, with an initial weight of approx. 0.3 g, triple determination was carried out. The arithmetic average of the measurements is taken as the water content. Initial weighing was carried out in determination of the starting values of raw materials (higher measurement values) in an air-conditioned room at 23° C. and 50% rH. Initial weighing of the dried adhesive tapes in the measuring vials was carried out in a protective nitrogen atmosphere ("glove box"), in which a constant humidity of less than 3 ppm was maintained. In order to minimize the effect of the dry environment as much as possible, after opening the aluminum bag with the dried adhesive tapes, the measuring vial was filled with the sample amount and sealed within 2 min. In order to allow evaluation of both the dried pressure-sensitive adhesive and the remaining layer structure, the pressure-sensitive adhesive was peeled off the layer having a barrier effect.

EXAMPLES

Production of the adhesive tapes according to the invention was carried out in the laboratory in three steps.

Product Structure A (Without an Additional Release Liner)

1) Production of a Layer Having a Barrier Effect/Getter-Material-Containing Layer/Carrier Layer Laminate As an example of the group of layers with a barrier effect, a laminate composed of an aluminum film (d=20 µm) and a PET film (23 µm) from the firm Novelis was selected. 40 µm of the getter-material-containing layer was applied from solution with a doctor blade to the PET side (see composition in Table 1). The solvent was removed for 10 min at room temperature followed by 10 min at 110° C. The getter-material-containing layer was laminated together with the carrier layer (one-side siliconized 50 µm PET film from the firm SKC) in such a way that it did not come into contact with the non-siliconized side.

2) Application of the Pressure-Sensitive Adhesive Layer

A pressure-sensitive adhesive was applied from solution with a doctor blade to the non-siliconized side (side with barrier effect) of the laminate of step 1) (see composition in Table 2). The solvent was removed for 10 min at room temperature followed by 10 min at 110° C. The layer thickness of the pressure-sensitive adhesive was 50 µm.

3) Storage for Determination of Drying Efficiency

In order to simulate an adhesive tape roll, two DIN A4 samples produced according to steps 1-2 were laminated together in such a way that the pressure-sensitive adhesive of the one structure came into contact with the siliconized side of the other structure. This two-layer structure was heat-sealed in an aluminum bag and stored for 7 days.

After 7 days, the residual humidity of the product structure located on the siliconized side of the other product structure was determined. The residual humidity was less than 20 ppm in all cases.

Product Structure B (With Additional Release Liner)

1) Production of a Layer Having a Barrier Effect/Getter-Material-Containing Layer/Carrier Layer Laminate As an example of the group of layers with a barrier effect, a laminate composed of an aluminum film (d=20 µm) and a PET film (23 μm) from the firm Novelis was selected. 40 μm of the getter-material-containing layer was applied from solution with a doctor blade to the PET side (see composition in Table 1). The solvent was removed for 10 min at room temperature followed by 10 min at 110° C. The getter-material-containing layer was laminated together with the carrier layer (50 μm PET film from the firm Laufenberg).

2) Application of the Pressure-Sensitive Adhesive Layer

A pressure-sensitive adhesive was applied from solution with a doctor blade to the aluminum side of the laminate of step 1) (see composition in Table 2). The solvent was removed for 10 min at room temperature followed by 10 min at 110° C. The layer thickness of the pressure-sensitive adhesive was 50 μm. The open adhesive layer was laminated with a 50 μm siliconized PET release liner from the firm SKC onto the siliconized side to form the adhesive composition.

3) Storage for Determination of Drying Efficiency

In order to simulate an adhesive tape roll, two DIN A4 samples produced according to steps 1-2 were laid over one another in such a way that the release liner of the one structure came into contact with the carrier layer of the other structure. The two-layer structure was heat-sealed in an aluminum bag, pressed together with a DIN A4 plate and a 2-kg weight in order to simulate the winding tension, and stored for 7 days.

After 7 days, the residual humidity of the product structure that had come into contact with the second structure on the carrier side was determined.

TABLE 1

| Composition of getter-material-containing layer | | |
|---|---|---|
| 100 parts | Tuftec P 1500 | SBBS with 30 wt % block polystyrene from the firm Asahi. The SBBS contains approx. 68 wt % diblock. |
| 100 parts | Escorez 5600 | Hydrogenated hydrocarbon resin with a softening point of 100° C. from the firm Exxon |
| 25 parts | Ondina 917 | White mineral oil from paraffinic and naphthenic fractions from the firm Shell |
| 40 parts | Calcium oxide | Absorbent getter material from the firm Sigma-Aldrich. CAS: 1305-78-8 |

A mixture of toluene and acetone in a ratio of 2:1 was used as a solvent. The solid content was 45% before addition of the getter. Calcium oxide was incorporated into the adhesive while vigorously stirring only shortly before coating.

TABLE 2

| Pressure-sensitive adhesive | | |
|---|---|---|
| 40 parts | Kraton G 1657 | SEBS with 13 wt % block polystyrene from the firm Kraton. The SEBS contains 36 wt % diblock. |
| 40 parts | Regalite 1100 | Fully hydrogenated hydrocarbon resin from the firm Eastman (ring and ball 100° C., DACP = 45, MMAP = 82). |
| 20 parts | Uvacure 1500 | Cycloaliphatic diepoxide from the firm Dow. |
| 1 part | Triarylsulfonium hexafluoroantimonate | Cationic photoinitiator from the firm Sigma-Aldrich. The photoinitiator has an absorption maximum in the range of 320 nm to 360 nm and was present in propylene carbonate as a 50 wt % solution. |

A mixture of toluene and benzine in a ratio of 3:7 was used as a solvent. The solid content was 50%.

TABLE 3

| Results | | | |
|---|---|---|---|
| | Getter-material-containing layer | Pressure-sensitive adhesive | Carrier layer |
| Adhesive force/N cm$^{-1}$ | 3.2 | 2.6 | — |
| WVTR/g m$^{-2}$ d$^{-1}$ | — | 31 | 14 |
| Initial moisture/ppm | — | 843 | 2348 |
| Moisture after 7-day storage in composite/ppm (structure A) | — | <20 ppm | <20 ppm |
| Moisture after 7-day storage in composite/ppm (structure B) | | <20 ppm | <20 ppm |

Comparative Example with Getter-Containing Layer in the Removable Liner

Here, the layer sequence was modified using a liner that was comparable to structure B but contained the getter-containing layer. For this purpose, the getter-material-containing layer described in Table 1 was applied from solution using a doctor blade to the carrier layer (50 μm PET film from the firm Laufenberg), dried, and laminated together with the non-siliconized side of the liner used in structure B (50 μm siliconized PET release liner from the firm SKC). In a second step, the pressure-sensitive adhesive of Table 2 was applied in a layer thickness of 50 μm to the siliconized side, which was now facing outward, and, after drying, laminated together with a layer having a barrier effect. A laminate of an aluminum film (d=20 μm) and a PET film (23 μm) from the firm Novelis was selected. Lamination was carried out with the aluminum side to form the pressure-sensitive adhesive.

TABLE 4

| Results for release | | | |
|---|---|---|---|
| | Structure A | Structure B | Comparative example |
| Layer thickness liner/μm | — | 50 μm | 150 μm |
| Liner release/cN cm$^{-1}$ | No liner used, but adhesive tape unrolled without problems | 5 | 13 |

The invention claimed is:

1. An adhesive tape for encapsulating electronic structures, comprising in the following order:
   a carrier layer without a barrier effect at least against water having a WVTR of at least 1 g/(m$^2$*d) (38° C., 90% relative humidity, 50 μm layer thickness);
   a layer containing at least one getter material capable of sorption at least of water;
   a layer having a barrier effect against water;
   a pressure-sensitive adhesive layer;
   wherein an outward-facing release layer lies on the carrier layer and/or the pressure-sensitive adhesive layer is covered with a release liner that has a release layer lying on the pressure-sensitive adhesive layer.

2. The adhesive tape as claimed in claim 1, wherein the carrier layer without a barrier effect at least against water is a film comprising a material selected from the group consisting of ethylene vinyl acetate, polyurethanes, cellulose acetate, polymethyl methacrylate, polyvinyl alcohols and paper or is a microperforated polyethylene film.

3. The adhesive tape as claimed in claim 1, wherein the getter material is selected from the group consisting of absorbent and adsorbent materials.

4. The adhesive tape as claimed in claim 1, wherein the getter material is selected from the group composed of calcium chloride, calcium oxide, boron trioxide, sodium sulfate, potassium carbonate, copper sulfate, magnesium perchlorate, magnesium sulfate, zeolites and mixtures of two or more of the above-mentioned substances.

5. The adhesive tape as claimed in claim 1, wherein the getter material is in the form of a dispersed phase.

6. The adhesive tape as claimed in claim 5, wherein the getter material is in the form of a dispersed phase in an adhesive.

7. The adhesive tape as claimed in claim 1, wherein the pressure-sensitive adhesive layer comprises a polymer base selected from the group consisting of styrene block copolymers, polyolefins and epoxy resins, and mixtures of two or more of these polymers.

8. The adhesive tape as claimed in claim 1, wherein the pressure-sensitive adhesive layer is covered with the release liner that has a release layer lying on the pressure-sensitive adhesive layer, wherein this release layer is a silicone, fluorinated silicone, silicone-copolymer, fluoropolymer, polycarbamate or polyolefin release layer.

9. The adhesive tape as claimed in claim 1, wherein the outward-facing release layer lies on the carrier layer and this release layer is a silicone release coating.

10. The adhesive tape as claimed in claim 1, wherein the layer having a barrier effect against water is selected from the group consisting of: (A) a composite of (i) a film selected from the group consisting of polyurethane, polypropylene, polyethylene, polyvinyl chloride, polyvinylidene chloride, polyethylene-2,6-naphthalate, polyacrylonitrile, polyethylene terephthalate, ethylene-vinyl alcohol copolymer, polyacrylate, and poly-$\varepsilon$-caprolactam films and (ii) at least one permeation-inhibiting layer arranged between said film (i) and the pressure-sensitive adhesive layer; (B) a metallic film; and (C) a glass film.

11. A method comprising encapsulating an electronic structure with the adhesive tape as claimed in claim 1.

* * * * *